United States Patent
Lee

(10) Patent No.: US 8,898,554 B2
(45) Date of Patent: Nov. 25, 2014

(54) NOC-BASED ADAPTIVE ERROR CORRECTION APPARATUS

(71) Applicant: Seoul National University of Technology Center for Industry Collaboration, Seoul (KR)

(72) Inventor: Seung Eun Lee, Seoul (KR)

(73) Assignee: Seoul National Unviersity of Technology Center for Industry Collaboration, Seoul (KR)

( * ) Notice: Subject to any disclaimer, the term of this patent is extended or adjusted under 35 U.S.C. 154(b) by 54 days.

(21) Appl. No.: 13/729,096

(22) Filed: Dec. 28, 2012

(65) Prior Publication Data
US 2013/0275804 A1    Oct. 17, 2013

(30) Foreign Application Priority Data
Apr. 12, 2012 (KR) .................. 10-2012-0038034

(51) Int. Cl.
G06F 11/00    (2006.01)
G06F 11/08    (2006.01)
H04L 1/00    (2006.01)

(52) U.S. Cl.
CPC .............. G06F 11/08 (2013.01); H04L 1/0014 (2013.01)
USPC ........................................ 714/800; 714/48

(58) Field of Classification Search
CPC ... G06F 11/08; H03M 13/09; H03M 13/1102; H03M 13/13; H03M 13/15; H04L 1/0014; H04L 1/0079
USPC ........... 709/228; 370/471, 537, 458; 714/701, 714/800, 48, 755
See application file for complete search history.

(56) References Cited

U.S. PATENT DOCUMENTS 7,010,607 B1 *    3/2006    Bunton ................. 709/228
7,096,414 B2 *    8/2006    Das Sharma .......... 714/800

(Continued)

FOREIGN PATENT DOCUMENTS

JP    10-135934    5/1998    ............ H04L 1/08

OTHER PUBLICATIONS

Yu, Qiaoyan, et al, "*Adaptive Error Control for NoC Switch-toSwitch Links in a Variable Noise Environment*", ECE Dept., University of Rochester, Rochester, NY 14627, IEEE, 2008, pp. 352-360.

(Continued)

*Primary Examiner* — David Ton
(74) *Attorney, Agent, or Firm* — Harness, Dickey & Pierce, P.L.C.

(57) ABSTRACT

An NoC-based error correction apparatus capable of supporting a network interface that transmits a flit between Tx and Rx IP-elements includes: an encoder configured to receive a k-bit flit from the Tx IP-element and encodes the k-bit flit into n-bit data; and a decoder configured to receive the n-bit data, decode the n-bit data into the k-bit flit, and output the k-bit flit, the decoder having an error correction circuit for correcting an error in the n-bit data, wherein a t-bit adaptive error correction code having a variable error correction capability depending on the number of bits (n) of the received data is applied to the error correction circuit, the error correction capability is proportional to the number of bits (n) of the received data, and the t-bit error correction code has the number of bits proportional to the number of bits (n) of the received data.

2 Claims, 2 Drawing Sheets

(56) References Cited

U.S. PATENT DOCUMENTS

| | | | |
|---|---|---|---|
| 8,514,885 B2 * | 8/2013 | Flynn et al. | 370/471 |
| 2003/0110422 A1 * | 6/2003 | Naffziger et al. | 714/48 |
| 2004/0095967 A1 * | 5/2004 | Sharma | 370/537 |
| 2008/0186998 A1 * | 8/2008 | Rijpkema | 370/458 |
| 2010/0146368 A1 * | 6/2010 | Chishti et al. | 714/755 |

OTHER PUBLICATIONS

Office Action, dated Aug. 8, 2012 of KR No. 10-2012-0038034, 4 pages.

* cited by examiner

NOC-BASED ADAPTIVE ERROR CORRECTION APPARATUS

CROSS REFERENCES TO RELATED APPLICATIONS

The present invention contains subject matter related to Korean Patent Application No. 2012-0038034, filed in the Korean Patent Office on Apr. 12, 2012, the entire contents of which is incorporated herein by reference.

FIELD

The present invention relates to a network-on-chip (NoC)-based adaptive error correction apparatus.

BACKGROUND

With a tendency of convergence in various fields such as computers, communication, and broadcasting, demands on system-on-chip (SoC) devices increase rather than demands on an application specific integrated circuit (ASIC) or an application specific standard product (ASSP). In addition, development of the SoC industry is more promoted as information technology (IT) devices are miniaturized in a lightweight with high performance.

The SoC is a highly-intensive semiconductor technology in which existing complicated systems having various functions are integrated into a single chip. Various techniques have been researched and developed to implement the SoC. Particularly, a technique of interconnecting various intellectual property (IP) elements embedded in a chip has been focused as an important factor.

In general, a bus-based interconnection type is employed to interconnect the IP elements. However, as chips are highly integrated, and the amount of information transmitted between the IP elements sharply increases, it is thought that the bus-based SoC reaches its structural limitation.

In order to overcome such a structural limitation of the bus-based SoC, a network-on-chip (NoC) technology has been proposed to interconnect the IP elements by applying a typical network scheme to a chip structure.

The NoC technology proposes a network type on-chip interconnect (OCI) scheme to overcome a structural limitation of the existing bus-based scheme. In this NoC scheme, it is possible to implement a high-speed SOC with high performance and a low power consumption.

In the NoC scheme of the related art, an error correction code or an error correction circuit is employed for correcting an error that may be generated in data transmission/receiving. In this way, an error bit that may be generated in data transmission/receiving is checked using the error correction code or circuit, and its result is output as a single bit for correction.

In order to ensure reliability in the error check of large capacity data transmission using the NoC element of the related art, an error correction circuit having a high error correction capability using a plurality of error check bits is demanded. If such an error correction circuit having a high error correction capability is provided, the entire SoC element becomes heavy, and its power consumption also increases.

On the contrary, the power consumption may be reduced if the error correction circuit has a low error correction capability. However, its reliability is not guaranteed relatively.

SUMMARY

The present invention provides an adaptive error correction apparatus capable of efficiently adjusting an error correction capability in consideration of both reliability and power consumption in a NoC-based network interface.

According to an aspect of the present invention, there is provided a network-on-chip (NoC)-based error correction apparatus capable of supporting a network interface (NI) that transmits a flit between a transmission side (Tx) intellectual property (IP) element and a receiving side (Rx) IP element, the apparatus including: an encoder configured to receive a k-bit flit from the Tx IP element and encodes the k-bit flit into n-bit data (where k and n denote any natural numbers); and a decoder configured to receive the n-bit data, decode the n-bit data into the k-bit flit, and output the k-bit flit, the decoder having an error correction circuit for correcting an error in the n-bit data, wherein a t-bit adaptive error correction code having a variable error correction capability depending on the number of bits (n) of the received data is applied to the error correction circuit (where t denotes any natural number), the error correction capability is proportional to the number of bits (n) of the received data, and the t-bit error correction code has a number of bits proportional to the number of bits (n) of the received data.

In the NoC-based error correction apparatus, an orthogonal Latin square code (OLSC) scheme may be used.

In the NoC-based error correction apparatus, the encoder may be a first exclusive OR gate having an input terminal where the k-bit flit is input.

In the NoC-based error correction apparatus, the decoder may include at least one second exclusive OR gate configured to receive a part of bits of the k-bit flit and a check bit for error correction and a majority voter configured to receive a signal output from the second exclusive OR gate and output a high-level value when a majority exceeding a half of bits of the received signal has a high level or outputs a low-level value when a majority exceeding a half of bits of the received signal has a low level.

BRIEF DESCRIPTION OF THE DRAWINGS

The foregoing and additional features and characteristics of this disclosure will become more apparent from the following detailed description considered with reference to the accompanying drawings, wherein.

DETAILED DESCRIPTION

Figure 1:
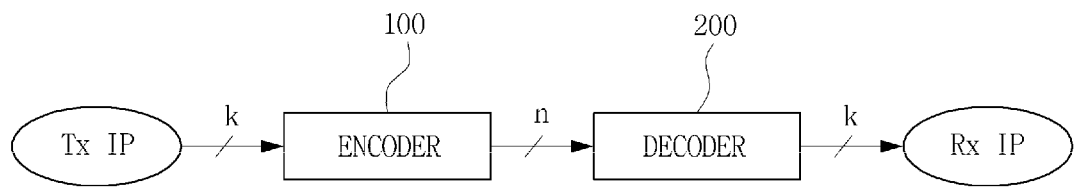
FIG. 1 is a block diagram illustrating a concept of the NoC-based error correction apparatus according to an embodiment of the invention.

Hereinafter, embodiments of the invention will be described in detail with reference to the accompanying drawings. It is noted that like reference numerals denote like elements throughout overall drawings. In addition, descriptions of well-known apparatus and methods may be omitted so as to not obscure the description of the representative embodiments, and such methods and apparatus are clearly within the scope and spirit of the present disclosure.

The terminology used herein is only for the purpose of describing particular embodiments and is not intended to limit the invention. As used herein, the singular forms "a", "an" and "the" may be intended to include the plural forms as well, unless the context clearly indicates otherwise. It is further to be noted that, as used herein, the terms "comprises", "comprising", "include", and "including" indicate the presence of stated features, integers, steps, operations, units, and/ or components, but do not preclude the presence or addition of one or more other features, integers, steps, operations, units, and/or components, and/or combination thereof.

The present invention has been made by contemplating a network-on-chip (NoC)-based network interface (NI). That is, the present invention relates to an adaptive error correction apparatus capable of supporting a network interface (NI) for transmitting a flit between a transmission side (Tx) IP element and a receiving side (Rx) IP element.

FIG. 1 is a block diagram illustrating a concept of the NoC-based adaptive error correction apparatus according to an embodiment of the invention.

Referring to FIG. 1, the adaptive error correction apparatus according to an embodiment of the invention includes an encoder 100 and a decoder 200.

The encoder 100 receives a k-bit flit from the Tx IP element and encodes the k-bit flit into n-bit data (where k and n denote any natural numbers).

The decoder 200 receives n-bit data from the encoder 100, decodes the n-bit data into the k-bit flit, and outputs the k-bit flit. The decoder 200 includes an error correction circuit for correcting an error in the n-bit data.

The k-bit flit output from the decoder 200 is transmitted to the Rx IP element.

In the error correction circuit according to an embodiment of the invention, a t-bit adaptive error correction code (where t denotes any natural number) has a variable error correction capability depending on the number of the received data bits (n).

The error correction circuit according to an embodiment of the invention may have an error correction capability proportional to the number of the received data (n) and apply a t-bit error correction bit having the number of bits proportional to the number of bits (n) of the received data.

The error correction apparatus according to an embodiment of the invention may be implemented using various types of error correction codes.

According to the present invention, out of various types of error correction codes, an orthogonal Latin square code (OLSC)-based scheme is proposed.

Figure 2:
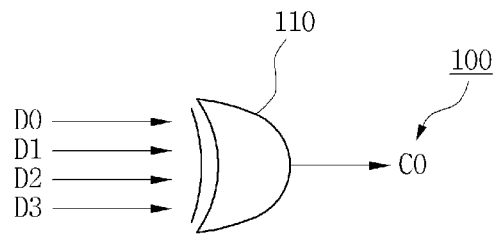
FIG. 2 is a block diagram illustrating an encoder in a case where an error correction capability is set to a single bit (1 bit) in an OLSC scheme according to an embodiment of the invention.

FIG. 2 is a block diagram illustrating an encoder in a case where an error correction capability is set to a single bit (1 bit) as an example for the 16-bit flit in the OLSC scheme according to an embodiment of the invention.

Referring to FIG. 2, the encoder 100 has an exclusive OR gate 110 configured to receive 4-bit data and generate a check bit C0. That is, the exclusive OR gate 110 receives data of 4 bits D0, D1, D2, and D3 and generates a check bit C0. In addition, other check bits C1, C2, and the like may be generated in a similar manner.

Figure 3:
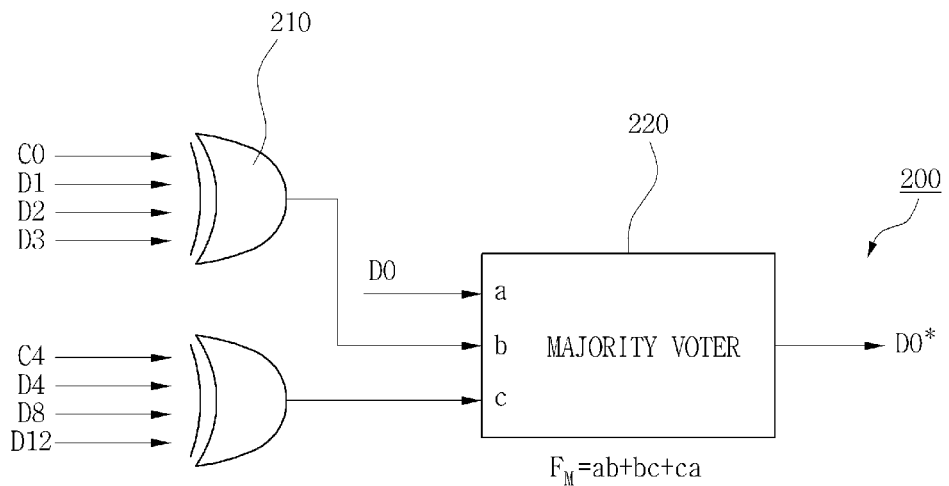
FIG. 3 is a block diagram illustrating a decoder in a case where an error correction capability is set to a single bit (1 bit) in an OLSC scheme according to an embodiment of the invention.

FIG. 3 is a block diagram illustrating a decoder in a case where the error correction capability is set to a single bit (1 bit) in the OLSC scheme according to an embodiment of the invention.

Referring to FIG. 3, the decoder 200 includes at least one exclusive OR gate 210 configured to receive a part of bits of the k-bit flit and a check bit for error correction and a majority voter 220 configured to receive a signal output from the exclusive OR gate 210 in a receiving terminal and output a high-level value H when a majority (exceeding a half) of the input bits have a high level H or outputs a low-level value L when a majority (exceeding a half) of the input bits have a low level L.

In FIG. 3, a pair of exclusive OR gates 210 are provided according to an embodiment of the invention. The bits C0, D1, D2, and D3 are input to the first exclusive OR gate, and the bits C4, D4, D8, and D12 are input to the second exclusive OR gate 210.

The majority voter 220 includes three input terminals a, b, and c and an output terminal $F_M$. In the majority voter 220, the bit D0 is input to the input terminal a, the output signal of the first exclusive OR gate 210 is input to the input terminal b, and the output signal of the second exclusive OR gate 210 is input to the terminal c.

A function $F_M$=ab+bc+ca is applied to the majority voter 220. Depending on the result of the function, a bit D0* as a result of the error correction is output from the output terminal $F_M$.

For example, in techniques of the related art for implementing a majority voter circuit, there are known an arithmetic-based design, in which overall binary input values are summed using an adder, and then, a high-level value H is output if the sum exceeds a half of the number of input bits, and a decomposition-based design, in which a part of the inputs are used as a control input of a multiplexer (MUX), and remaining input values are computed to obtain an output value based on decomposition.

Figure 4:
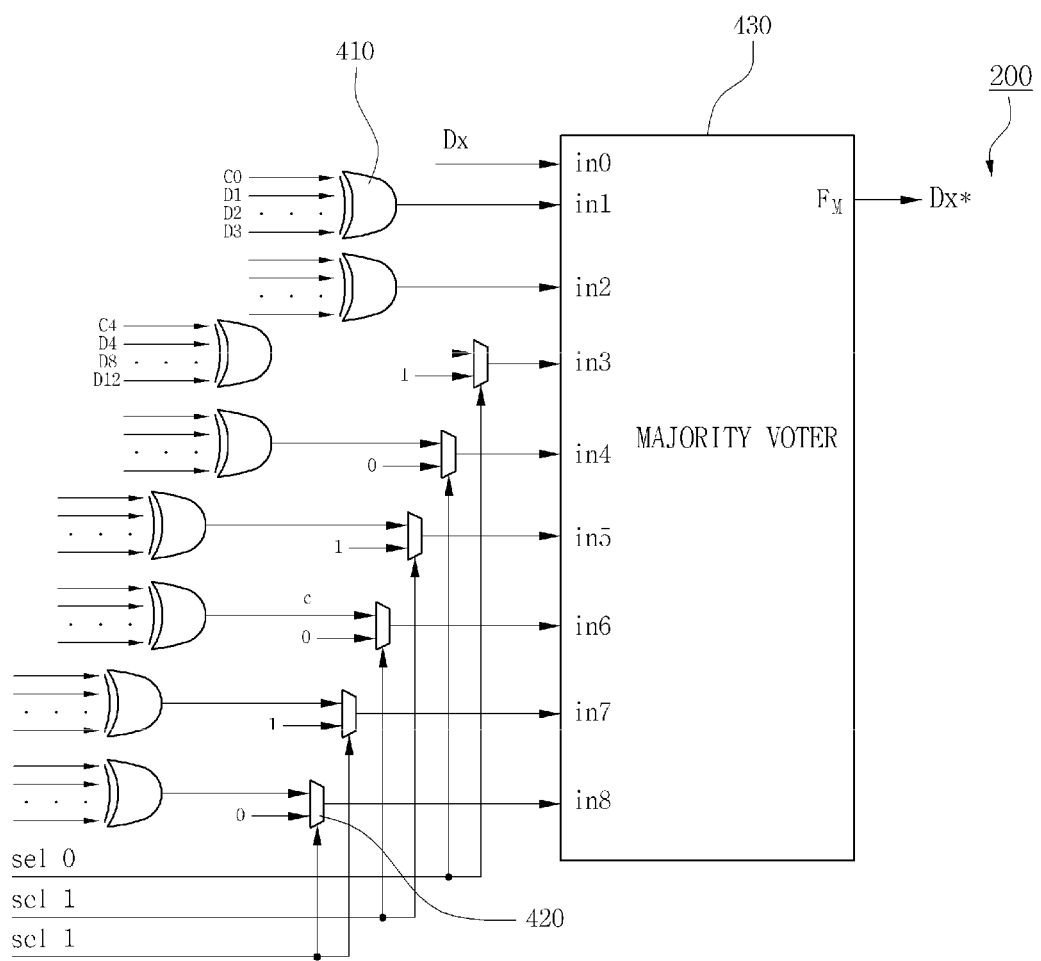
FIG. 4 is a block diagram illustrating a decoder in a case where an error correction capability is a variably set to 1 to 4 using 64 bits of flit data in an OLSC scheme according to an embodiment of the invention.

FIG. 4 is a block diagram illustrating a decoder in a case where the error correction capability is a variably set to 1 to 4 bits when the flit data is set to 64 bits in the OLSC scheme according to an embodiment of the invention.

FIG. 4 illustrates an extension of the example of FIGS. 2 and 3, in which the error correction capability in the OLSC scheme is a variably set to 1 to 4 bits.

Referring to FIG. 4, the decoder 200 includes a plurality of exclusive OR circuits 410, a MUX 420, and a majority voter 430, whose fundamental operational principles are similar to those of FIG. 3.

In the embodiment of FIG. 4, the error correction capability of the error correction apparatus may be controlled using three selection signals sel. Specifically, the error correction capability may be controlled in a real-timely manner depending on reliability of the system. The MUX 420 is controlled using three selection signals sel so that a desired error correction capability can be implemented using the received data and the received check bit. Finally, it is possible to implement an error correction apparatus having a variable error correction capability of 1 to 4 bits.

This enables optimization of the power consumptions in the encoder, the decoder, and the network by controlling the error correction capability depending on reliability required in the NoC.

According to the present invention, in the error correction circuit of the network interface in the NoC, a size of the variable error correction codes is adaptively determined depending on the number of bits of the signal received by the decoder. Therefore, it is possible to reduce a power consumption in the error correction apparatus and obtain reliability.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

What is claimed is:

1. An network-on-chip (NoC)-based error correction apparatus capable of supporting a network interface (NI) that transmits a flit between a transmission side (Tx) intellectual property (IP) element and a receiving side (Rx) IP element, the apparatus comprising:
    an encoder configured to receive a k-bit flit from the Tx IP element and encodes the k-bit flit into n-bit data (where k and n denote any natural numbers); and
    a decoder configured to receive the n-bit data, decode the n-bit data into the k-bit flit, and output the k-bit flit, the decoder having an error correction circuit for correcting an error in the n-bit data,
    wherein a t-bit adaptive error correction code having a variable error correction capability depending on the number of bits (n) of the received data is applied to the error correction circuit (where t denotes any natural number),
    wherein an orthogonal Latin square code (OLSC) scheme is used,
    wherein the encoder is a first exclusive OR gate having an input terminal where the k-bit flit is input,
    wherein the decoder includes
    at least one second exclusive OR gate configured to receive a part of bits of the k-bit flit and a check bit for error correction, and
    a majority voter configured to receive a signal output from the second exclusive OR gate and output a high-level value when a majority (exceeding a half) of bits of the received signal has a high level or output a low-level value when a majority (exceeding a half) of bits of the received signal has a low level.

2. The NoC-based error correction apparatus according to claim 1, wherein the error correction capability is proportional to the number of bits (n) of the received data, and the t-bit error correction code has the number of bits proportional to the number of bits (n) of the received data.

\* \* \* \* \*